(12) United States Patent
Jacques (10) Patent No.: US 10,412,899 B2
(45) Date of Patent: Sep. 17, 2019

(54) LOPPERS WITH DETACHABLE SAW AND PRUNER

(71) Applicant: Shawn Jacques, Woodbury, CT (US)

(72) Inventor: Shawn Jacques, Woodbury, CT (US)

( * ) Notice: Subject to any disclaimer, the term of this patent is extended or adjusted under 35 U.S.C. 154(b) by 111 days.

(21) Appl. No.: 15/827,106

(22) Filed: Nov. 30, 2017

(65) Prior Publication Data

US 2019/0159405 A1    May 30, 2019

(51) Int. Cl.
  *A01G 3/025* (2006.01)
  *A01G 3/06* (2006.01)
  *A01G 3/08* (2006.01)

(52) U.S. Cl.
  CPC .......... *A01G 3/0251* (2013.01); *A01G 3/065* (2013.01); *A01G 3/083* (2013.01)

(58) Field of Classification Search
  CPC ....... A01G 3/0251; A01G 3/083; A01G 3/065
  USPC ......................................... 30/123, 131, 144
  See application file for complete search history.

(56) References Cited

U.S. PATENT DOCUMENTS

| | | | |
|---|---|---|---|
| 209,587 A * | 11/1878 | Rose | |
| 3,733,636 A | 5/1973 | Osadsky | |
| 3,949,440 A | 4/1976 | Guerra | |
| 4,716,653 A * | 1/1988 | Skyba | A01G 3/08 16/DIG. 25 |
| 4,843,667 A | 7/1989 | Hanly, Sr. | |
| 5,025,621 A | 6/1991 | DeMarco | |
| 5,142,721 A * | 9/1992 | Sessions | B25B 7/22 7/128 |
| 5,546,661 A * | 8/1996 | Yang | A01G 3/02 30/146 |
| 6,901,620 B1 * | 6/2005 | Hirshberg | A01G 3/0251 30/131 |
| 7,194,809 B2 * | 3/2007 | Skluzak | B26B 5/00 30/339 |
| 7,607,231 B2 | 10/2009 | Klecker et al. | |
| 8,707,491 B1 * | 4/2014 | Dykyj | B25F 1/003 172/374 |
| 9,854,748 B2 * | 1/2018 | Poehlmann | A01G 3/02 |
| 2005/0247523 A1 | 11/2005 | Sewell | |
| 2017/0055458 A1 * | 3/2017 | Helmsderfer | A01G 3/02 |
| 2018/0132424 A1 * | 5/2018 | Poehlmann | A01G 3/083 |
| 2018/0310486 A1 * | 11/2018 | Thorn | A01G 3/02 |
| 2019/0159405 A1 * | 5/2019 | Jacques | A01G 3/0251 |

* cited by examiner

*Primary Examiner* — Hwei-Siu C Payer
(74) *Attorney, Agent, or Firm* — Lipsitz & McAllister, LLC (57) ABSTRACT

A tree pruning assembly is provided. The assembly comprises a lopper comprising two lopper handles pivotally connected to one another and a respective cutting blade arranged on an end of each of the lopper handles, a pruner adapted to be detachably connected to either one of the lopper handles, a saw adapted to be detachably connected to the other of the lopper handles, and a respective connection device for detachably connecting each of the pruner and the saw to a respective one of the lopper handles. The connection devices may be of identical construction so that the saw and pruner can each be connected to either of the lopper handles. A connection device for connecting a saw or pruner to a lopper handle is also encompassed by the present invention.

11 Claims, 13 Drawing Sheets

LOPPERS WITH DETACHABLE SAW AND PRUNER

BACKGROUND OF THE INVENTION

The present invention relates to the field of tree pruning. More specifically, the present invention relates to devices for pruning and cutting tree limbs.

Homeowners and landscapers typically employ various tools for pruning and trimming trees and shrubs, including loppers (e.g., long handled pruning shears), pruners or pruning shears (e.g., short-handled scissor-like cutters), and pruning saws (e.g., mini folding saws for tree limbs). Tools of these types are typically required for use during the same job. However, these tools can be stored in different locations when not in use, and may be misplaced or separated from one another during or after use.

It would be advantageous to provide a mechanism for keeping tools such as loppers, pruners, and pruning saws together during storage as well as during use. It would be further advantageous to provide loppers with a detachable saw and pruner.

The present invention provides the foregoing and other advantages.

SUMMARY OF THE INVENTION

The present invention relates to loppers with a detachable saw and pruner.

In an example embodiment of the invention, a tree pruning assembly is provided. The assembly comprises a lopper comprising two lopper handles pivotally connected to one another and a respective cutting blade arranged on an end of each of the lopper handles, a pruner adapted to be detachably connected to either one of the lopper handles, a saw adapted to be detachably connected to the other of the lopper handles, and a respective connection device for detachably connecting each of the pruner and the saw to a respective one of the lopper handles. The connection devices may be of identical construction so that the saw and pruner can each be connected to either of the lopper handles.

The connection devices may each comprise a pin extending from the pruner or the saw, and a slot in each of the lopper handles for accepting the pin extending from the pruner or the saw. A top end of the slot may have a widened receiving area for accepting a corresponding widened end of the pin. The slot may have an elongated section which is narrower than the widened receiving area. A depth of the slot may be greater than an extent of the corresponding widened end of the pin. A releasable safety lock may be provided which extends into the slot for locking the pin in a position at a bottom end of the slot.

The connection devices may further comprise, in combination with the pin and slot, a receiving pocket fixed to each of the lopper handles adapted to receive and releasably hold the pruner or the saw. The receiving pockets may each comprise one or more resilient retaining clips positioned inside the receiving pocket for releasably retaining the pruner or the saw in the receiving pocket. The receiving pockets may be fixed to the lopper handles by one of rivets, screws, adhesive, adhesive tape, straps, Velcro, or the like.

In another example embodiment, the connection devices each comprise a receiving pocket fixed to each of the lopper handles adapted to receive and releasably hold the pruner or the saw, without requiring the pin and slot arrangement. In such an embodiment, the receiving pockets may each comprise one or more resilient retaining clips positioned inside the receiving pocket for releasably retaining the pruner or the saw in the receiving pocket.

The one or more resilient retaining clips may comprise a single resilient retaining clip fixed to the inside of the receiving pocket in a center of one wall of the receiving pocket. Alternatively, the one or more resilient retaining clips may comprise two resilient retaining clips, each of the retaining clips being arranged on opposite ends of an opening of the receiving pocket.

The receiving pockets may be fixed to the lopper handles by one of rivets, screws, adhesive, adhesive tape, straps, Velcro, or the like.

The connection devices may further comprise, in combination with the receiving pockets, a retaining mechanism fixed to each of the lopper handles for releasably securing the pruner or the saw to the respective lopper handle once the pruner or the saw is positioned in the receiving pocket. The retaining mechanisms may comprise one of a Velcro strap, a ratchet strap, a clamp, a clip, a clip strap, a cam strap, and a side release buckle strap, or the like.

In a further example embodiment, the retaining mechanisms may comprise a resilient or spring-loaded retaining clip fixed to each of the lopper handles for securing the pruner or the saw to the respective lopper handle once the pruner or the saw is positioned in the receiving pocket. The resilient or spring-loaded retaining clips may be adapted to receive pruner handles of the pruner or saw handles of the saw with a snap-fit once a head of the pruner or an end of the saw (e.g., either a blade end of a fixed saw or either end of a folding saw) is positioned in the receiving pocket.

In another example embodiment, the connection devices may comprise a quick release coupling comprising a first coupling part disposed on the pruner or the saw, and a second coupling part disposed on each of the lopper handles. The first quick release coupling and the second quick release coupling may each further comprise a push button release arranged on the first coupling part or the second coupling part.

The pruner may comprise lightweight snips or shears. The saw may comprise a lightweight mini folding tree limb saw.

The connection devices may be arranged at an upper half of the respective lopper handle proximal to the cutting blades.

A connection device for connecting a saw or pruner to a lopper handle is also encompassed by the present invention. Such a connection device may be adapted to be fixed to a lopper handle (or the handle of another type of tool such as a rake, a shovel, a pole saw, a broom, and the like). The connection device may comprise any of the elements of the connection devices discussed above, including but not limited to the receiving pockets, retaining mechanisms, and quick release couplings discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1A:
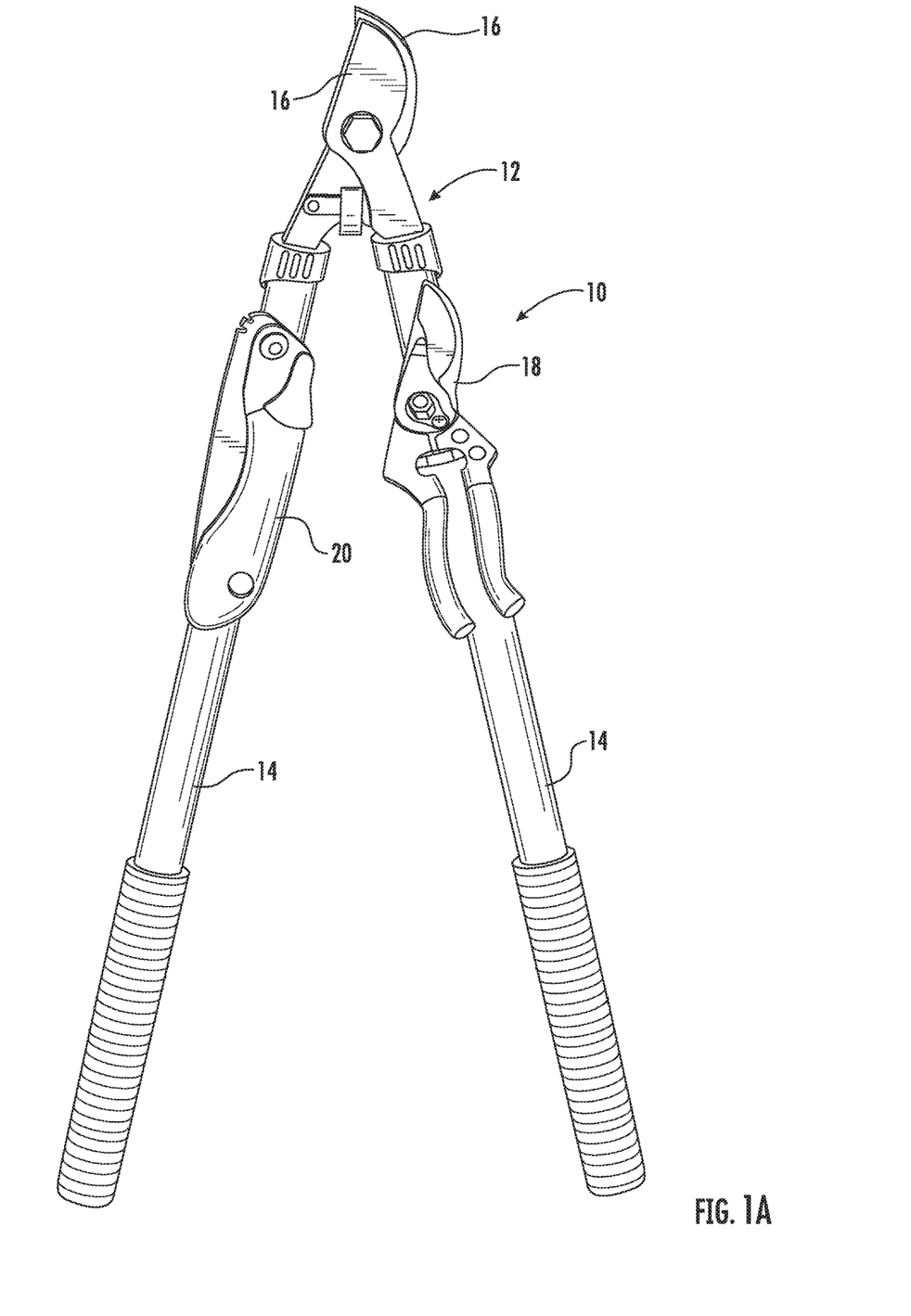
FIGS. 1A-1F show an example embodiment of a tree pruning assembly in accordance with the present invention.
Figure 1B:
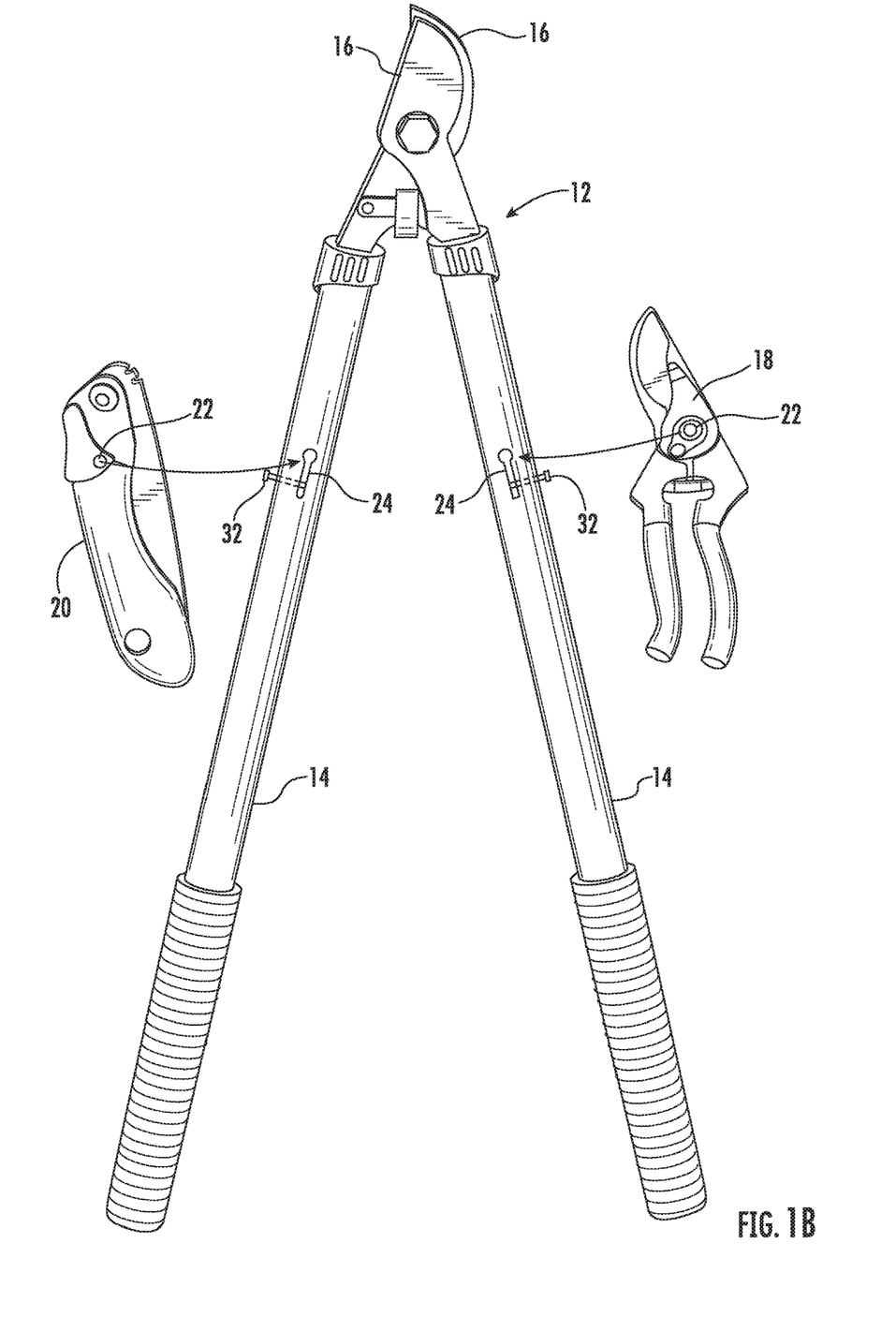

FIGS. 1A and 1B show an example embodiment of a tree pruning assembly 10 provided in accordance with the present invention. The assembly comprises a lopper 12 comprising two lopper handles 14 pivotally connected to one another and a respective cutting blade 16 arranged on an end of each of the lopper handles 14, a pruner 18 adapted to be detachably connected to either one of the lopper handles 14, a saw 20 adapted to be detachably connected to the other of the lopper handles 14, and a respective connection device for detachably connecting each of the pruner 18 and the saw 20 to a respective one of the lopper handles 14. The connection devices may be of identical construction so that the saw 20 and pruner 18 can each be connected to either of the lopper handles 14.

The connection device enables the loppers 12 to be used and/or stored with the pruner 18 and saw 20 arranged thereon. The pruner 18 and saw 20 can be easily detached from the corresponding lopper handle 14 for use, and reattached thereto subsequent to use so that the tools remain together for subsequent use and storage.

Figure 1C:
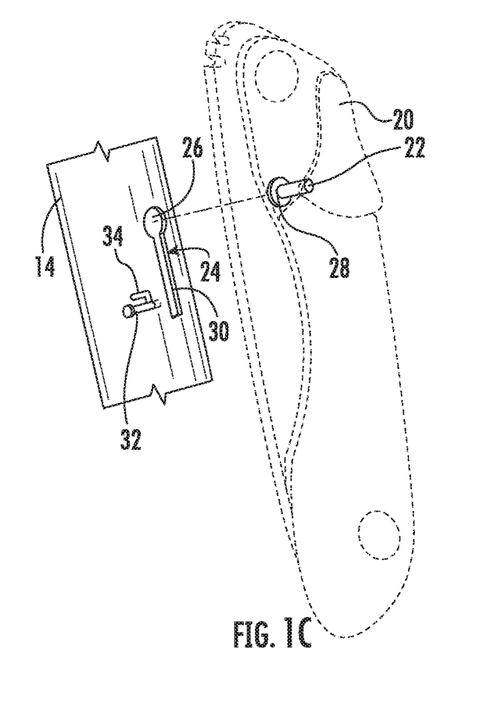
Figure 1D:
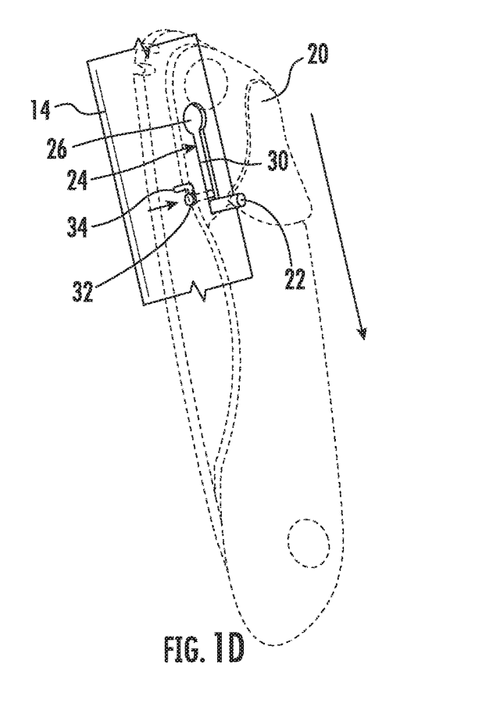
Figure 1E:
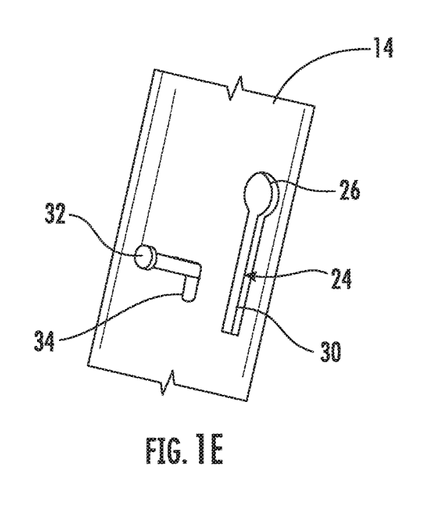
Figure 1F:
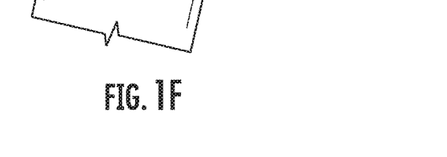
Figure 1G:
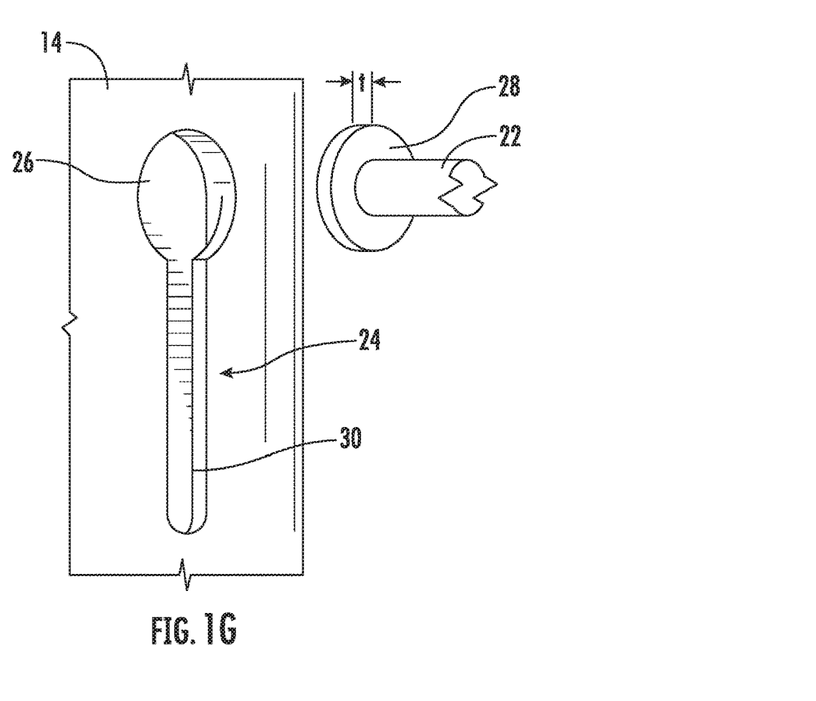
FIGS. 1G and 1H show example embodiments of a pin and slot arrangement in accordance with the present invention.

In one example embodiment, the connection devices may each comprise a pin 22 extending from the pruner 18 or the saw 20, and a slot 24 in each of the lopper handles 14 for accepting the pin 22 extending from the pruner 18 or the saw 20. As shown for example in FIGS. 1C and 1D, a top end of the slot 24 may have a widened receiving area 26 for accepting a corresponding widened end 28 of the pin 22. The slot 24 may have an elongated section 30 which is narrower than the widened receiving area 26 as shown in FIG. 1G. A depth of the slot 24 may be greater than an extent (e.g., thickness "t") of the corresponding widened end of the pin 28.

A releasable safety lock may be provided which extends into the slot 24 for locking the pin 22 in a position at a bottom end of the slot 24. The safety lock may comprise a quick release push button type locking pin 32 that extends into the slot 24 through the lopper handle 14 as shown in FIG. 1B. The push button locking pin 32 may be pressed to release the locking pin 32 from its biased position extending into the slot. Once the button is pushed, the locking pin 32 will be withdrawn from the interior of the slot 24 and the pin 22 of the pruner 18 or saw 20 will be able to move past the locking pin 32, so that the pruner or saw can be moved into or out of a position at the bottom end of the slot 24.

Alternatively, the safety lock may comprise a spring-loaded locking pin 32 that is biased into a position extending into the slot 24. The biasing force of the spring-loaded locking pin 32 may be overcome by simply pushing or pulling the pruner 18 or saw 20 into and out of position at the bottom end of the slot, which causes the pin 22 of the pruner 18 or saw 20 to impact the locking pin 32 and move it against the biasing force in a direction away from the inside of the slot 24. Alternatively, the locking pin may simply be pulled by hand out of the slot 24 against the biasing force to allow the pin 22 to pass by for either locking or unlocking.

FIGS. 1C-1F show an alternate embodiment of a safety lock where the locking pin 32 is movable in an L-shaped locking slot 34 from an unlocked or release position (shown in FIG. 1E) where the pin 32 does not extend into the slot 24, into a locked position (shown in FIG. 1F) where the pin 32 extends into the slot 24. The pin 32 is moved from the unlocked position into the locked position by sliding the pin 32 in the L-shaped slot 34 and pushing down into the handle 14. The pin 32 is moved from the locked to the unlocked position by simply sliding the pin 32 in the opposite direction in the L-shaped slot 34.

Figure 2A:
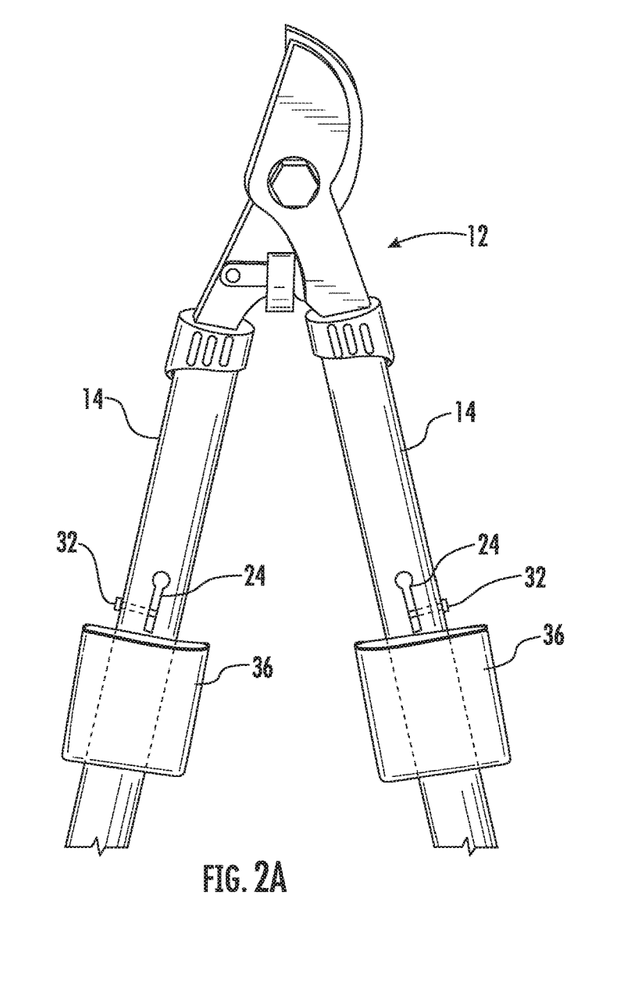
FIGS. 2A and 2B show a further example embodiment of a tree pruning assembly in accordance with the present invention.
Figure 2B:
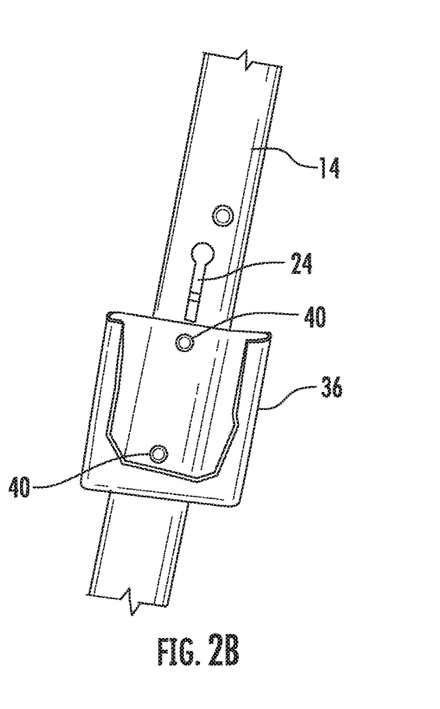

As shown in FIGS. 2A and 2B, the connection devices may further comprise, in combination with the pin 22 and slot 24, a receiving pocket 36 fixed to each of the lopper handles 14. The receiving pockets 36 may be adapted to receive and releasably hold the pruner 18 or the saw 20. In operation, once the pin 22 of the pruner 18 or saw 20 is positioned in the receiving area 26 of the slot 24, the pruner 18 or saw 20 can then be slid down the length of the slot 24 until the head of the pruner 18 or an end of the saw 20 (e.g., either a blade end of the saw or either end of a folding saw) is positioned in the receiving pocket 36. The receiving pocket 36 together with the pin 22 and slot 24 arrangement securely holds the pruner 18 and saw 20 on the respective lopper handle 14 so that the lopper 12 can be used and/or stored with the pruner 18 or saw 20 positioned thereon. The receiving pockets 36 may also act as safety devices shielding a user from a sharp head of the pruner 18 or an end of the saw 20.

Figure 1H:
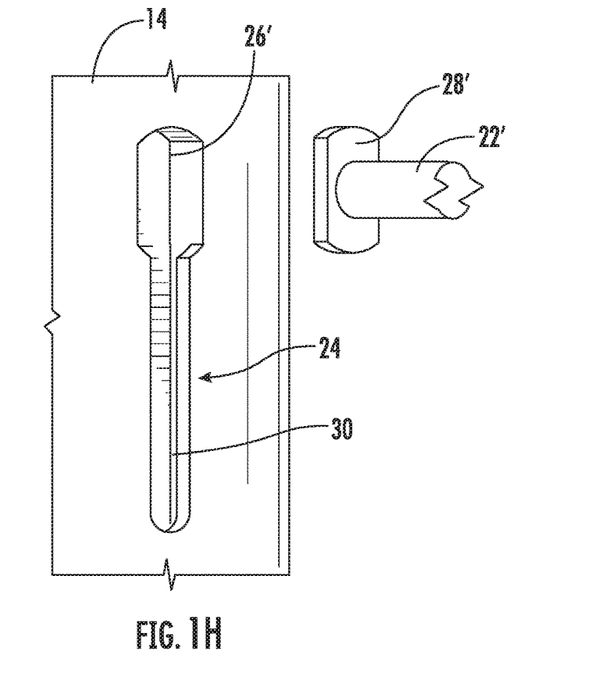

In a further embodiment, the safety lock (locking pin 32) described above may be used with the receiving pocket 36 and pin 22 and slot 24 combination. In an embodiment that includes the receiving pockets, the widened end of the pin may comprise a ball or square end. In an embodiment that does not include the receiving pockets 36, the widened end of the pin 22 may be elongated with flat sides or may comprise a rectangle, which prevents rotation of the pin 22 in the slot 24 and thus prevents rotation of the tool (saw 20 or pruner 18) out of alignment with the lopper handle 14. FIG. 1H shows an example of such an alternate embodiment of a pin 22' with an elongated widened portion 28' with flat sides. In such an embodiment, the receiving area 26' may be correspondingly shaped to receive the widened portion 28'. Those skilled in the art will appreciate that the widened portion 28, 28' may comprise a variety of other shapes (including irregular shapes), as long as the widened portion 28, 28' fits into the receiving area 26, 26', allows the pruner 18 or saw 20 to slide within the slot 24, and prevents removal of the pin 22 from the elongated section 30 of the slot 24 in a direction transverse to the extent of the elongated section 30.

Figure 3A:
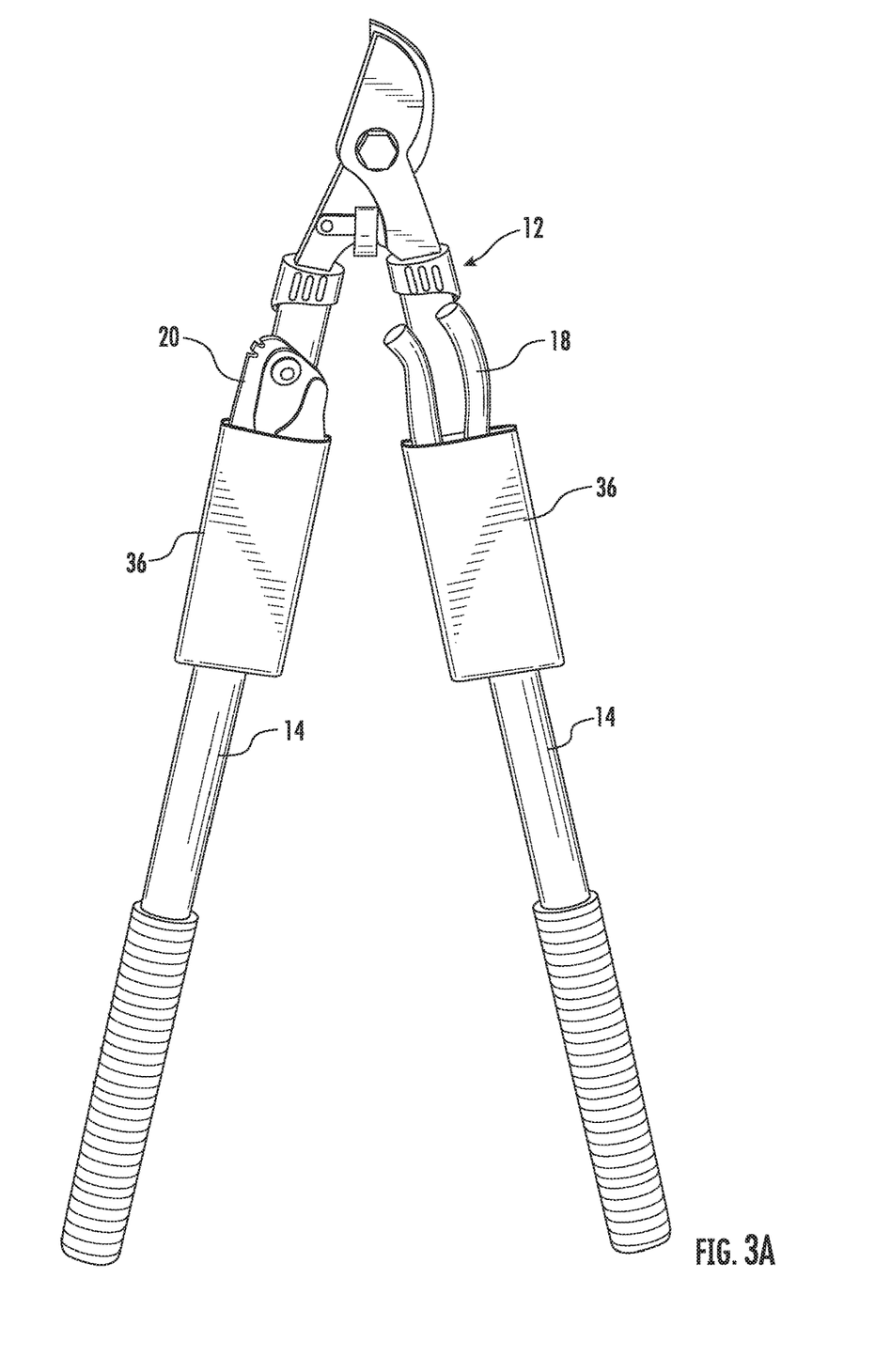
FIGS. 3A and 3B show a further example embodiment of a tree pruning assembly in accordance with the present invention.

FIG. 3A shows an example embodiment in which the connection device comprises the receiving pockets 36 without the slot 24 and pin 22 arrangement. In such an embodiment, the receiving pockets 36 may be deeper than those illustrated in FIG. 2A. In such an example embodiment, the receiving pockets 36 are fixed to each of the lopper handles 14 and adapted to receive and releasably hold the pruner 18 or the saw 20, without requiring the pin 22 and slot 24 arrangement or any other device for securing the saw 20 or pruner 18 within the slot 24.

Figure 3B:
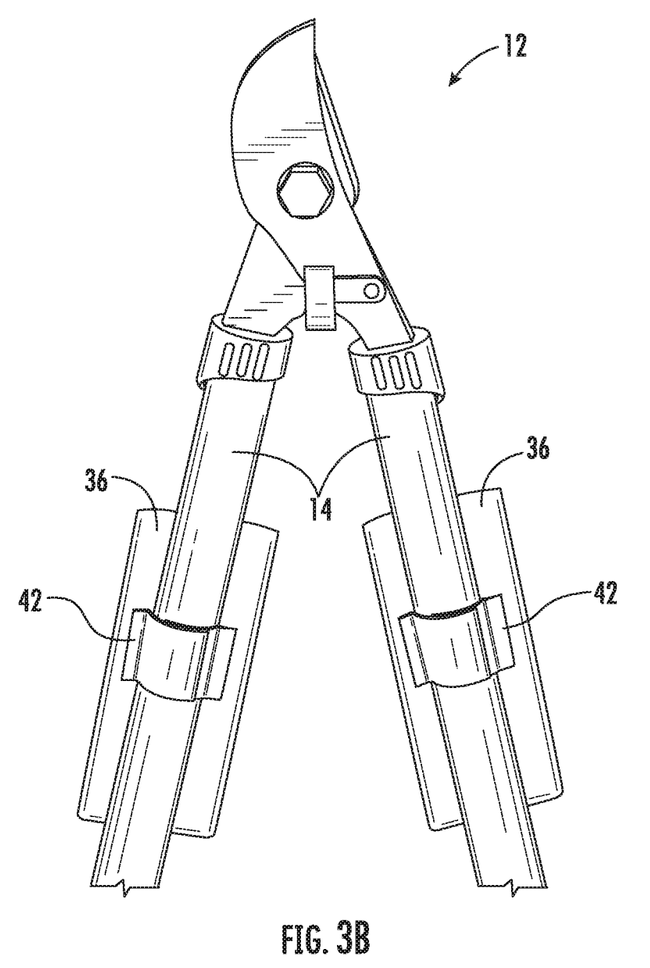

The receiving pockets 36 may be fixed to the lopper handles 14 by one of screws or rivets 40 (as shown in FIG. 2B), adhesive, adhesive tape, straps or Velcro 42 (as shown in FIG. 3B), or the like.

Figures 4A, 4B:
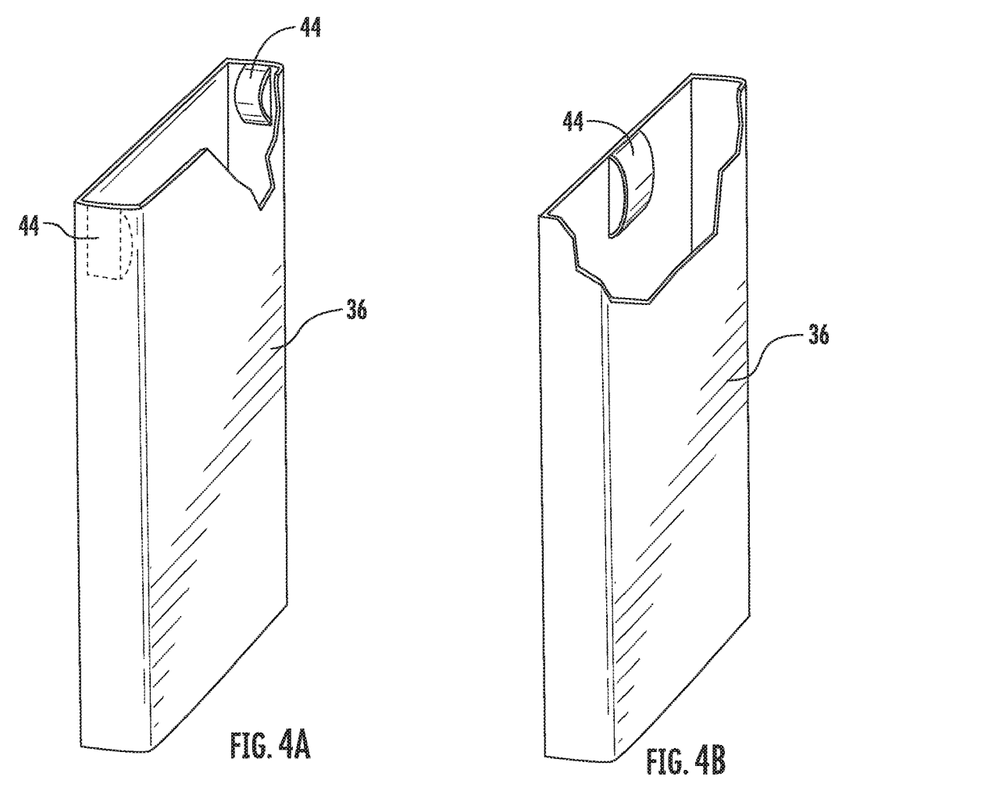
FIGS. 4A-4C show example embodiments of a receiving pocket in accordance with the present invention.

As shown in FIGS. 4A and 4B, the receiving pockets 36 may each comprise one or more resilient retaining clips 44 positioned inside each of the receiving pockets 36 for releasably retaining the pruner 18 or the saw 20 in the receiving pocket 36. The retaining clips 44 may be provided in the receiving pockets 36 in any of the embodiments mentioned herein employing the receiving pockets 36. For example, the one or more resilient retaining clips 44 may comprise a single resilient retaining clip 44 fixed to the inside of the receiving pocket 36 in a center of one wall of the receiving pocket 36, as shown in FIG. 4B. Alternatively, the one or more resilient retaining clips 44 may comprise two resilient retaining clips 44, each of the retaining clips 44 being arranged on opposite ends of an opening of the receiving pocket 36, as shown in FIG. 4A. Other arrangements and combinations of retaining clip(s) 44 may be provided. The resilient retaining clips 44 may comprise spring clips that put pressure on a portion of the pruner 18 or saw 20 once the pruner 18 or saw 20 is inserted into the receiving pocket 36. The pruner 18 and saw 20 may simply be pushed into or pulled out of the receiving pocket with enough force to overcome the resistance provided by the retaining clip(s), which force is sufficient to prevent the pruner 18 or saw 20 from falling out of the receiving pockets 36 during use.

The receiving pockets 36 may be made of a durable fabric material, a rubber material, a plastic material, a non-slip material, a textured material, or the like. Further, the receiving pockets 36 may comprise a resilient material and be sized slightly smaller than the head of the pruner 18 or end of the saw 20 such that the receiving pockets 36 expand upon insertion of the pruner 18 or saw 20 and conform closely to the shapes thereof, assisting in securing the pruner 18 or saw 20 in the receiving pocket 36.

Figure 4C:
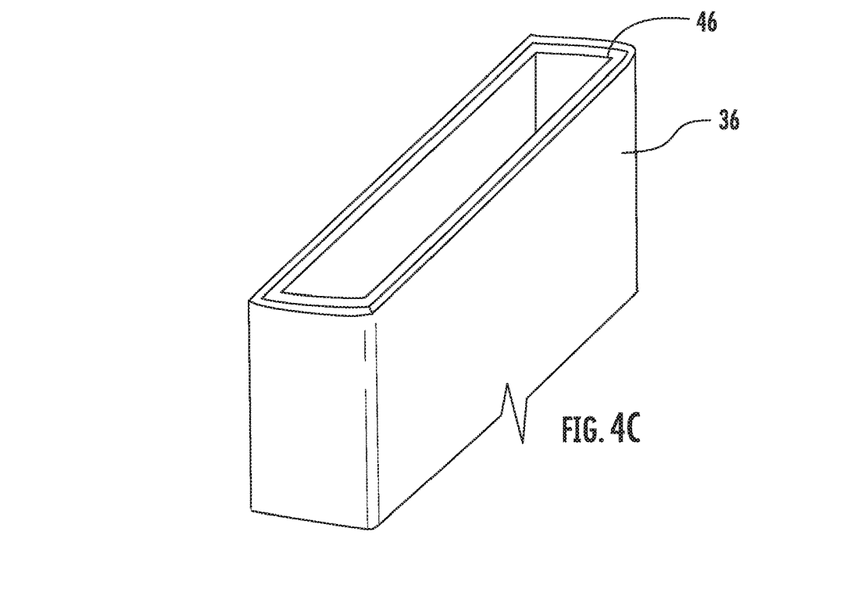

In addition, as shown in FIG. 4C, an interior of the receiving pockets 36 may be provided with a liner 46 in the form of one of foam, rubber, a non-slip material or a textured material to assist in securing the pruner 18 or saw 20 in the receiving pocket 36.

Figure 5A:
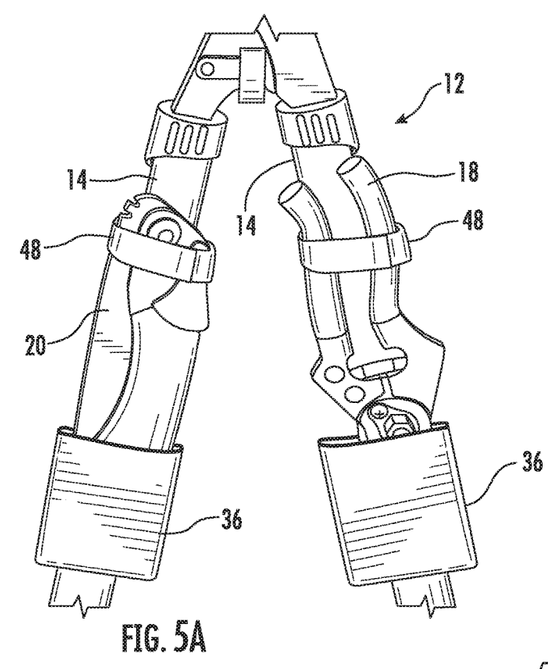
FIGS. 5A and 5B show a further example of a of a tree pruning assembly in accordance with the present invention.
Figure 5B:
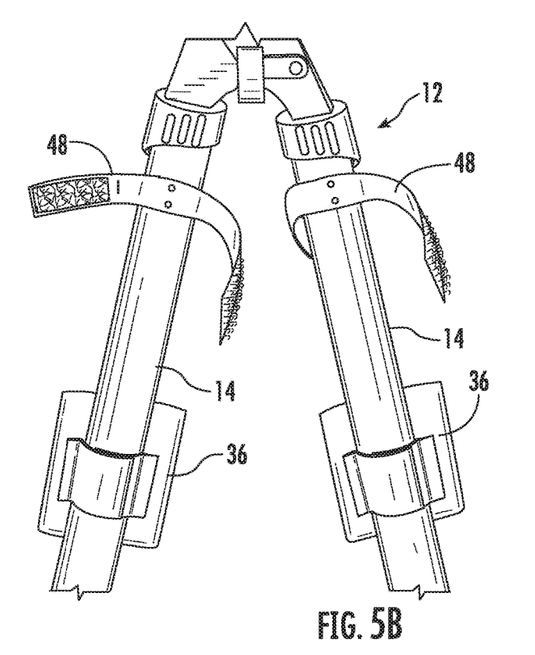

As shown in FIGS. 5A and 5B, the connection devices may further comprise, in combination with the receiving pockets 36, a retaining mechanism 48 fixed to each of the lopper handles 14 for releasably securing the pruner 18 or the saw 20 to the respective lopper handle 14 once the pruner 18 or the saw 20 is positioned in the receiving pocket 36. The retaining mechanisms 48 may comprise one of a Velcro strap, a ratchet strap (e.g., such as those used on ski boots or snowboard bindings and the like), a clamp, a clip, a clip strap, a cam strap, a side release buckle strap, or the like.

Figure 6A:
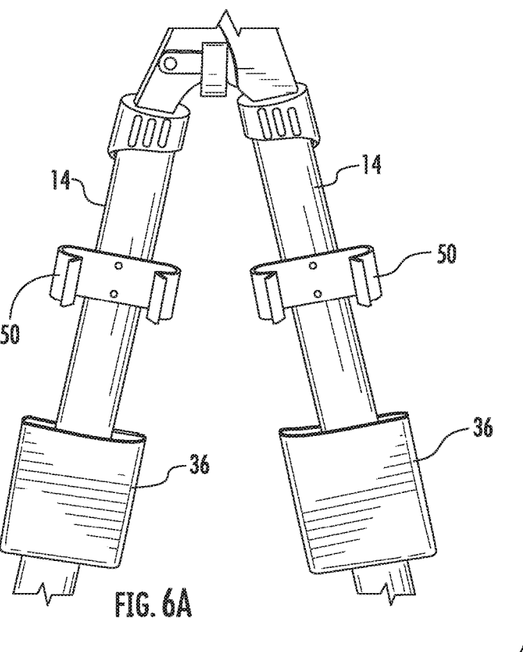
FIGS. 6A and 6B show a further example of a of a tree pruning assembly in accordance with the present invention.
Figure 6B:
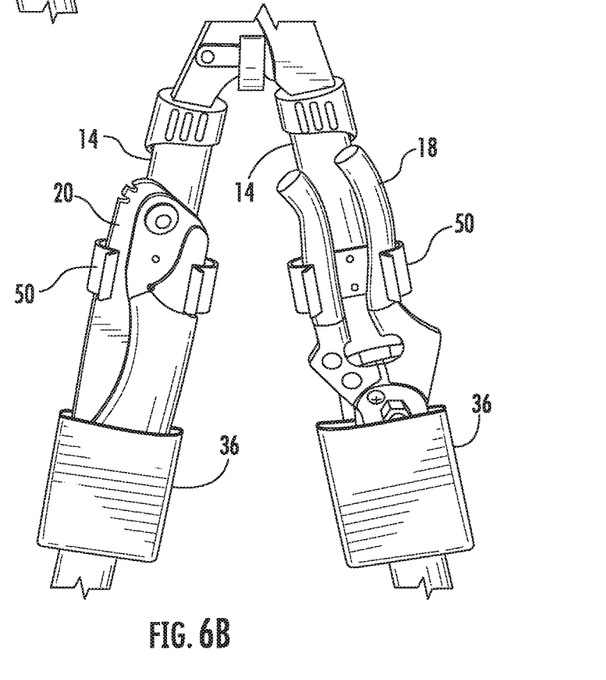

In a further example embodiment as shown in FIGS. 6A and 6B, the retaining mechanisms may comprise a resilient or spring-loaded retaining clip 50 fixed to each of the lopper handles 14 for securing the pruner 18 or the saw 20 to the respective lopper handle 14 once the pruner 18 or the saw 20 is positioned in the receiving pocket 36. The resilient or spring-loaded retaining clips 50 may be adapted to receive pruner handles of the pruner 18 or an end of the saw 20 with a snap-fit once a head of the pruner 18 or an opposite end of the saw 20 is positioned in the corresponding receiving pocket 36.

Figure 7A:
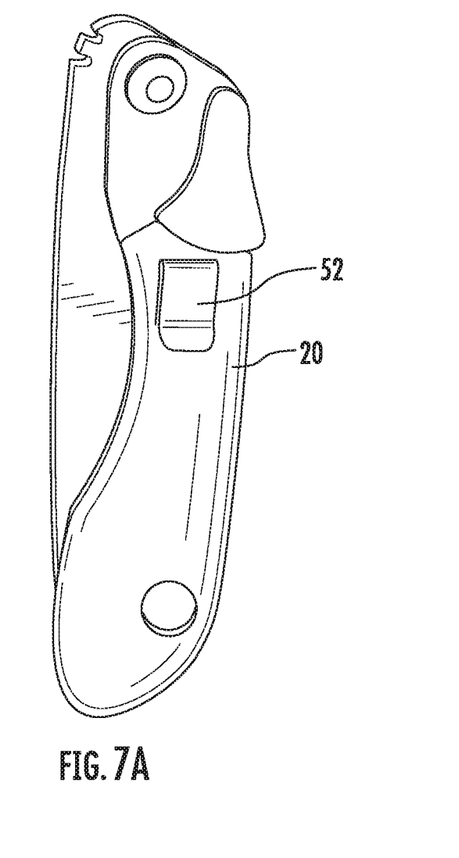
FIGS. 7A and 7B show an example embodiment of a retaining mechanism in accordance with the present invention.
Figure 7B:
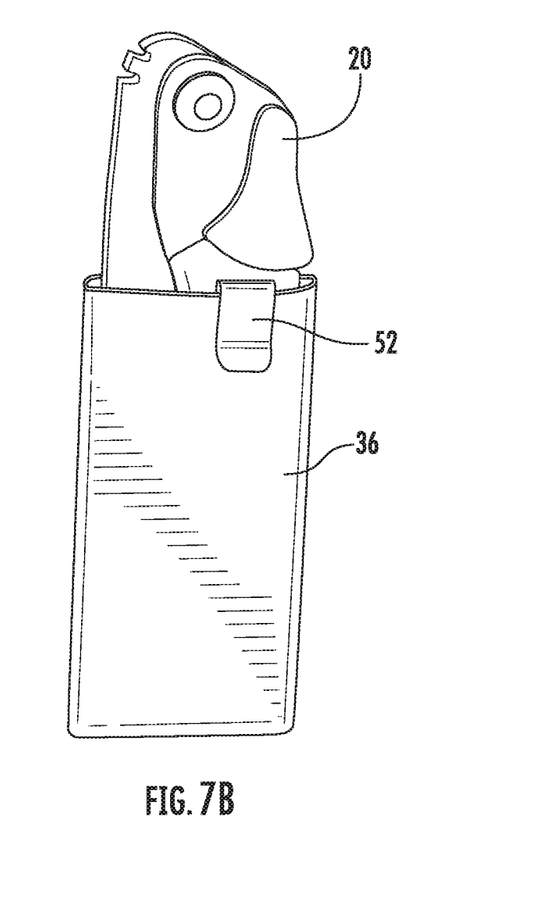

As shown in FIGS. 7A and 7B, in a further example embodiment the retaining mechanism may further comprise a resilient or spring-loaded clip 52 affixed to the pruner 18 or saw 20. When the saw 20 or pruner 18 is inserted into the receiving pocket, the clip 52 will expand and slide over the side of the receiving pocket 36, gripping the side of the receiving pocket 36 in order to retain the pruner 18 or saw 20 in position in the receiving pocket 36. FIGS. 7A and 7B show the clip 52 affixed to the saw 20. However, the same or similar clip can be fixed to the pruner 18.

Figure 8A:
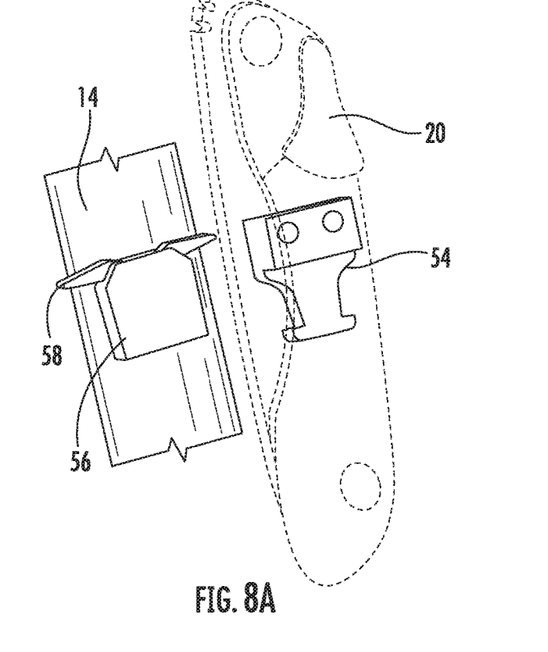
FIGS. 8A-8C show an example embodiment of a connection device in accordance with the present invention.
Figure 8B:
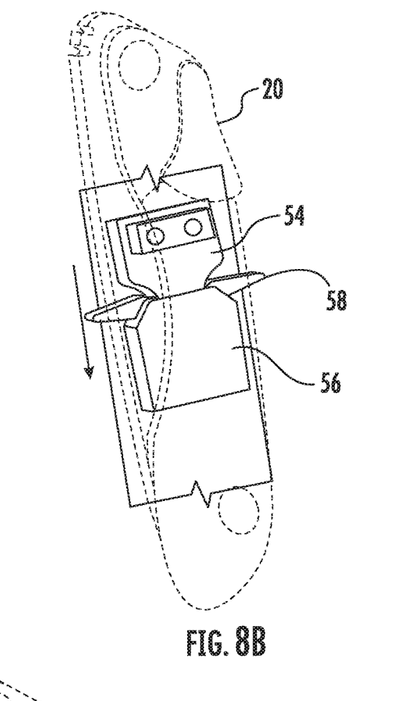
Figure 8C:
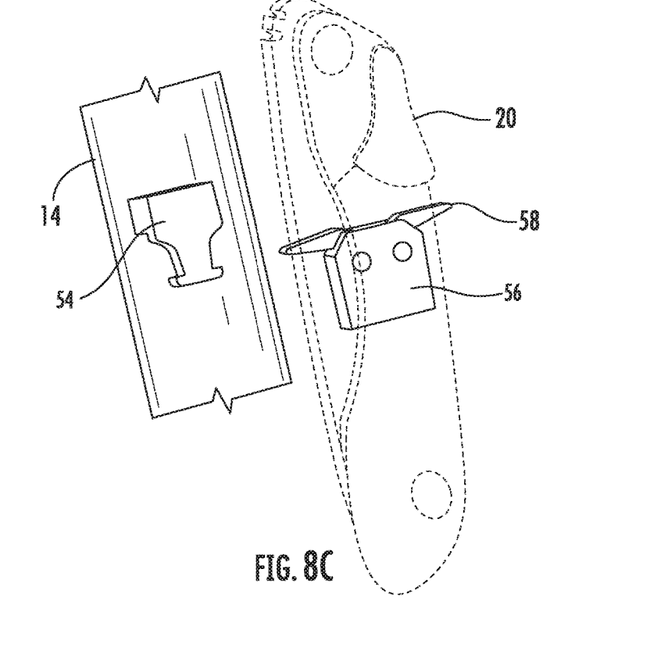

In another example embodiment as shown in FIGS. 8A-8C, the connection devices may comprise a quick release coupling comprising a first coupling part 54 disposed on the pruner or the saw, and a second coupling part 56 disposed on each of the lopper handles 14. As shown in FIGS. 8A and 8C, the coupling parts 54 and 56 may be interchanged and fixed to either pruner 18/saw 20 or the lopper handle 14. The first quick release coupling 54 and the second quick release coupling 56 may each further comprise a push button release 58 arranged on the first coupling part 54 or the second coupling part 56. FIGS. 8A-8C show the coupling part affixed to the saw 20. However, the same or similar coupling part can be fixed to the pruner 18.

Figure 9:
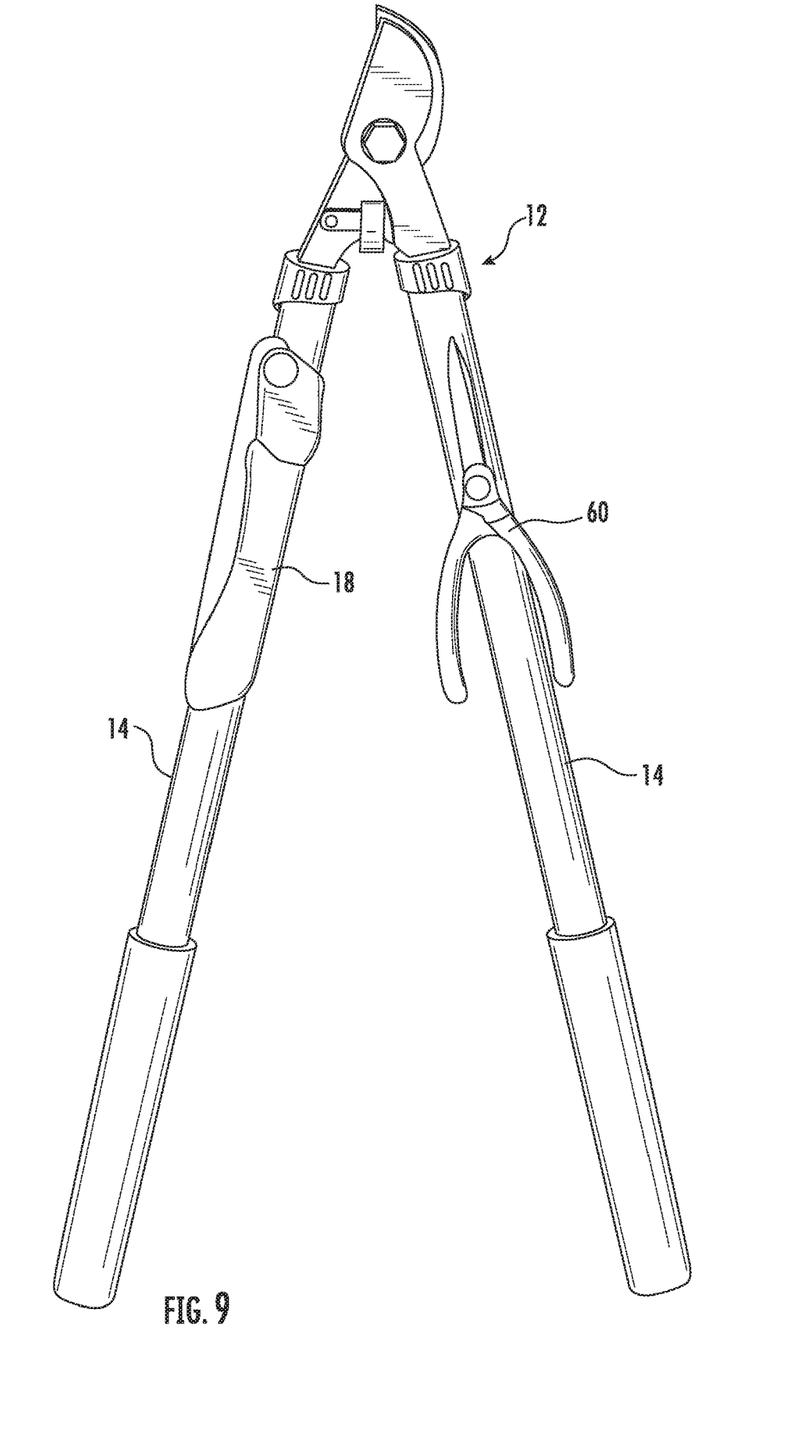
FIG. 9 shows a further example embodiment of a tree pruning assembly in accordance with the present invention.

The pruner 18 may comprise lightweight snips or shears. The saw 20 may comprise a lightweight mini folding tree limb saw. FIG. 9 shows an example embodiment in which a lightweight folding saw 18 and snips 60 are connected to the lopper handles 14.

The connection devices may be arranged at an upper half of the respective lopper handle 14 proximal to the cutting blades 16.

A connection device for connecting a saw 20 or pruner 18 to a lopper handle 14 is also encompassed by the present invention. Such a connection device may be adapted to be fixed to a lopper handle 14 and used to connect a saw 20 or pruner 18 thereto. The connection device may comprise any of the elements of the connection devices discussed above, including but not limited to the receiving pockets 36, retaining mechanisms, and quick release couplings discussed above.

Those skilled in the art will appreciate that even though not specifically mentioned, various of the connection devices described above may be used in combination or on their own. For example, and without limitation, the slot and pin connection may be used with a strap or clip, or with a spring-loaded clip, the receiving pockets may be used without any other connection element, and the quick release coupling may be combined with the strap or clip. Other combinations are possible.

In addition, those skilled in the art will appreciate that the present invention may be expanded to encompass other tools, in particular, the connection devices disclosed herein can be fixed to or integrated into a handle of any type of tool in order to connect other, smaller tools thereto. For example, the connection devices may be adapted and used to connect small hand tools (e.g., such as mini hand saws, pruning shears, screw drivers, knives, pliers, scissors, hammers, tape measures, and the like) to the handles of larger tools (e.g., rakes, shovels, hoes, pole saws, brooms, and the like).

It should now be appreciated that the present invention provides an advantageous tree pruning assembly comprising a lopper with a detachable pruner and saw, as well as a connection device for connecting hand tools to larger tools.

Although the invention has been described in connection with various illustrated embodiments, numerous modifications and adaptations may be made thereto without departing from the spirit and scope of the invention as set forth in the claims.

What is claimed is:

1. A tree pruning assembly, comprising:
   a lopper comprising two lopper handles pivotally connected to each other and a respective cutting blade arranged on an end of each of the lopper handles;
   a pruner adapted to be detachably connected to either one of the lopper handles;
   a saw adapted to be detachably connected to the other of the lopper handles; and
   a respective connection device for detachably connecting each of the pruner and the saw to a respective one of the lopper handles;
   wherein:
   the connection devices are of identical construction;
   the connection devices each comprise:
      a pin extending from the pruner or the saw; and
      a slot in each of the lopper handles for accepting the pin extending from the pruner or the saw;
   a top end of the slot has a widened receiving area for accepting a corresponding widened end of the pin;
   the slot has an elongated section which is narrower than the widened receiving area; and
   a depth of the slot is greater than an extent of the corresponding widened end of the pin.

2. The tree pruning assembly in accordance with claim 1, further comprising a releasable safety lock extending into the slot for locking the pin in a position at a bottom end of the slot.

3. The tree pruning assembly in accordance with claim 1, wherein the connection devices further comprise:
   a receiving pocket fixed to each of the lopper handles adapted to receive and releasably hold the pruner or the saw.

4. The tree pruning assembly in accordance with claim 3, wherein the receiving pockets each comprise one or more resilient retaining clips positioned inside the receiving pocket for releasably retaining the pruner or the saw in the receiving pocket.

5. The tree pruning assembly in accordance with claim 3, wherein the receiving pockets are fixed to the lopper handles by one of rivets, screws, adhesive, adhesive tape, straps, and Velcro.

6. The tree pruning assembly in accordance with claim 4, wherein the one or more resilient retaining clips comprises a single resilient retaining clip fixed to the inside of the receiving pocket in a center of one wall of the receiving pocket.

7. The tree pruning assembly in accordance with claim 4, wherein the one or more resilient retaining clips comprises two resilient retaining clips, each of the retaining clips being arranged on opposite ends of an opening of the receiving pocket.

8. The tree pruning assembly in accordance with claim 1, wherein:
   the pruner comprises lightweight snips or shears;
   the saw comprises a lightweight mini folding tree limb saw.

9. The tree pruning assembly in accordance with claim 1, wherein the connection devices are arranged at an upper half of the respective lopper handle proximal to the cutting blades.

10. A tree pruning assembly, comprising:
    a lopper comprising two lopper handles pivotally connected to each other and a respective cutting blade arranged on an end of each of the lopper handles;
    a pruner adapted to be detachably connected to either one of the lopper handles;
    a saw adapted to be detachably connected to the other of the lopper handles;
    a respective connection device for detachably connecting each of the pruner and the saw to a respective one of the lopper handles;
    the connection devices being of identical construction, each of the connection devices comprising:
       a pin extending from the pruner or the saw; and
       a slot in each of the lopper handles for accepting the pin extending from the pruner or the saw; and
    a releasable safety lock extending into the slot for locking the pin in a position at a bottom end of the slot.

11. The tree pruning assembly in accordance with claim 10, wherein:
    a top end of the slot has a widened receiving area for accepting a corresponding widened end of the pin;
    the slot has an elongated section which is narrower than the widened receiving area; and
    a depth of the slot is greater than an extent of the corresponding widened end of the pin.

* * * * *